US012789774B2

(12) United States Patent
Kim et al.

(10) Patent No.: US 12,789,774 B2
(45) Date of Patent: Nov. 10, 2026

(54) CONTROL DEVICE OF BRAKE SYSTEM

(71) Applicant: HL MANDO CORPORATION, Gyeonggi-do (KR)

(72) Inventors: Minseong Kim, Gyeonggi-do (KR); Sang Woo Kim, Gyeonggi-do (KR); Seungcho Han, Gyeonggi-do (KR)

(73) Assignee: HL MANDO CORPORATION, Gyeonggi-do (KR)

( * ) Notice: Subject to any disclaimer, the term of this patent is extended or adjusted under 35 U.S.C. 154(b) by 612 days.

(21) Appl. No.: 17/617,281

(22) PCT Filed: Jun. 8, 2020

(86) PCT No.: PCT/KR2020/007419
§ 371 (c)(1),
(2) Date: Dec. 7, 2021

(87) PCT Pub. No.: WO2020/246866
PCT Pub. Date: Dec. 10, 2020

(65) Prior Publication Data

US 2022/0227340 A1 Jul. 21, 2022

(30) Foreign Application Priority Data

Jun. 7, 2019 (KR) ........................ 10-2019-0067246
Jun. 7, 2019 (KR) ........................ 10-2019-0067247
Jun. 7, 2019 (KR) ........................ 10-2019-0067248

(51) Int. Cl.
*B60T 8/92* (2006.01)
*B60T 8/36* (2006.01)
(Continued)

(52) U.S. Cl.
CPC ................ *B60T 8/92* (2013.01); *B60T 8/368* (2013.01); *B60T 8/885* (2013.01); *B60T 13/745* (2013.01);
(Continued)

(58) Field of Classification Search
USPC ............................................................ 701/70
See application file for complete search history.

(56) References Cited

U.S. PATENT DOCUMENTS

2009/0079259 A1 3/2009 Iwasaki et al.
2009/0189439 A1 * 7/2009 Abe .................... G01L 19/0645
303/113.1
(Continued)

FOREIGN PATENT DOCUMENTS

CN 108639038 10/2018
CN 108944883 12/2018
(Continued)

OTHER PUBLICATIONS

"Chen, A kind of control method of double three-phase machine drive system and double three-phase machine" (Year: 2019).*
(Continued)

*Primary Examiner* — James M Mcpherson
*Assistant Examiner* — Bakari Underwood
(74) *Attorney, Agent, or Firm* — WOMBLE BOND DICKINSON (US) LLP

(57) ABSTRACT

A control device of a brake system, according to the present invention, includes, as redundancy, a first control unit for controlling the valve, the motor and the like of a brake system by receiving a sensor unit input, and a second control unit capable of performing the same function as the first control unit when the first control unit malfunctions, and thus the present invention can control the brake system of a vehicle by using the second control unit in an emergency situation in which the first control unit does not normally operate.

13 Claims, 3 Drawing Sheets

(51) Int. Cl.

| | |
|---|---|
| ***B60T 8/88*** | (2006.01) |
| ***B60T 13/74*** | (2006.01) |
| ***B60T 17/22*** | (2006.01) |
| ***H02K 3/50*** | (2006.01) |
| ***H02K 7/102*** | (2006.01) |
| ***H02K 11/21*** | (2016.01) |
| ***H02K 11/33*** | (2016.01) |
| ***H02P 25/22*** | (2006.01) |
| ***H02P 29/028*** | (2016.01) |

(52) U.S. Cl.

CPC ................ *B60T 17/22* (2013.01); *H02K 3/50* (2013.01); *H02K 7/102* (2013.01); *H02K 11/21* (2016.01); *H02K 11/33* (2016.01); *H02P 25/22* (2013.01); *H02P 29/028* (2013.01); *B60T 13/74* (2013.01); *B60T 2220/04* (2013.01); *B60T 2270/10* (2013.01); *B60T 2270/304* (2013.01); *B60T 2270/402* (2013.01); *B60T 2270/403* (2013.01); *B60T 2270/404* (2013.01); *B60T 2270/413* (2013.01); *B60T 2270/82* (2013.01); *B60T 2270/88* (2013.01); *H02K 2203/09* (2013.01); *H02K 2211/03* (2013.01); *H02K 2213/06* (2013.01)

(56) References Cited

U.S. PATENT DOCUMENTS

| | | | | |
|---|---|---|---|---|
| 2009/0189441 | A1 | 7/2009 | Degoul et al. | |
| 2011/0320099 | A1 | 12/2011 | Kim | |
| 2013/0282249 | A1* | 10/2013 | Heise | B60T 13/746 701/70 |
| 2013/0289842 | A1* | 10/2013 | Dabbs | B60T 17/221 701/70 |
| 2014/0142829 | A1 | 5/2014 | Strengert et al. | |
| 2015/0061362 | A1 | 3/2015 | Kikawa et al. | |
| 2016/0009263 | A1 | 1/2016 | Feigel et al. | |
| 2017/0072920 | A1* | 3/2017 | Besier | B60T 8/4081 |
| 2018/0046161 | A1* | 2/2018 | Yhr | G05B 9/03 |
| 2018/0065609 | A1 | 3/2018 | Leiber et al. | |
| 2018/0118183 | A1 | 5/2018 | Spieker | |
| 2019/0100237 | A1 | 4/2019 | Klesing | |
| 2019/0351884 | A1 | 11/2019 | Tajima et al. | |
| 2021/0163026 | A1* | 6/2021 | Ochida | B60W 60/0015 |
| 2022/0073038 | A1* | 3/2022 | Suzuki | F16D 65/18 |
| 2022/0266805 | A1* | 8/2022 | Park | B60T 8/885 |
| 2024/0045426 | A1* | 2/2024 | Ditty | G06N 3/063 |

FOREIGN PATENT DOCUMENTS

| | | | |
|---|---|---|---|
| CN | 108964561 | A * | 12/2018 |
| CN | 109843672 | | 6/2019 |
| JP | 2009-196626 | | 9/2009 |
| JP | 2018-118700 | | 8/2018 |
| KR | 10-2012-0000840 | | 1/2012 |
| KR | 10-2016-0049807 | | 5/2016 |
| KR | 10-2018-0126258 | | 11/2018 |
| KR | 10-2019-0032597 | | 3/2019 |
| KR | 10-2019-0038662 | | 4/2019 |
| WO | 2018/192986 | | 10/2018 |

OTHER PUBLICATIONS

Office Action dated Sep. 20, 2023 for Chinese Patent Application No. 202080042089.1 and its English machine translation from Google Translate.

Office Action dated Sep. 22, 2023 for Chinese Patent Application No. 202080042125.4 and its English machine translation from Google Translate.

Office Action dated Sep. 22, 2023 for Chinese Patent Application No. 202080042136.2 and its English machine translation from Google Translate.

Extended European Search Report dated Jul. 26, 2023 for European Patent Application No. 20819402.7.

International Search Report for PCT/KR2020/007419 mailed on Sep. 21, 2020 and its English translation from WIPO (now published as WO 2020/246866).

Written Opinion of the International Searching Authority for PCT/KR2020/007419 mailed on Sep. 21, 2020 and its English translation by Google Translate (now published as WO 2020/246866).

Office Action dated Jan. 17, 2024 for U.S. Appl. No. 17/617,268.

Office Action dated Feb. 8, 2024 for U.S. Appl. No. 17/617,282.

Office Action dated Oct. 22, 2024 for Korean Patent Application No. 10-2020-0069323 and its English translation from Global Dossier.

Office Action dated Oct. 31, 2024 for Korean Patent Application No. 10-2020-0069325 and its English translation from Global Dossier.

Decision to Rejection dated Apr. 27, 2026 for Korean Patent Application No. 10-2020-0069323 and its English translation provided by Applicant's foreign counsel.

* cited by examiner

CONTROL DEVICE OF BRAKE SYSTEM

CROSS-REFERENCE TO RELATED APPLICATIONS

The present application is the national stage of International Patent Application No. PCT/KR2020/007419 filed on Jun. 8, 2020, which claims the priority to Korean Patent Application No. 10-2019-0067246 filed in the Korean Intellectual Office on Jun. 7, 2019, Korean Patent Application No. 10-2019-0067247 filed in the Korean Intellectual Office on Jun. 7, 2019, and Korean Patent Application No. 10-2019-0067248 filed in the Korean Intellectual Office on Jun. 7, 2019, the entire contents of which are incorporated herein by reference.

TECHNICAL FIELD

The present invention relates to a brake for a vehicle, and more particularly, to technology for controlling a brake.

BACKGROUND ART

A brake system is absolutely necessary for a vehicle. This is because a vehicle that cannot be stopped cannot travel. Therefore, for the safety of passengers, the stability of a brake system cannot be emphasized enough.

Recently, as an interest in autonomous vehicles and electric vehicles has increased, brake systems have also been required to have stronger braking power and stability. To this end, an electronic master booster has been used instead of the conventional hydraulic system, and an integrated dynamic brake (IDB) system, in which an anti-lock brake system (ABS) and an electronic stability control (ESC) system are integrated, has been developed. The use of such an IDB system has made it possible to reduce the size and weight of a brake system and has brought results of providing various functions and significantly improving stability.

However, since such an IDB system includes many electronic devices, the IDB system always has a risk of a failure. When, during driving of a vehicle, a brake system fails and is in an inoperable state, it can lead to a serious accident, and thus, it is necessary to prepare for the inoperable state of the brake system.

The inventors of the present invention have made efforts to solve the problems of brake systems according to the related art. The inventors of the present invention have completed the present invention after much effort to complete a system capable of normally operating a brake system in response to an unexpected situation even when a part of the brake system fails.

DISCLOSURE

Technical Problem

The present invention is directed to providing a brake system in which an entire system can operate normally even when a part of the system fails.

Meanwhile, other objects of the present invention which are not explicitly stated will be further considered within the scope easily deduced from the following detailed description and the effects thereof.

Technical Solution

According to an exemplary embodiment of the present invention, a control device of a brake system includes a sensor unit including at least one of a pedal sensor, a pressure sensor, and a motor position sensor, a first control unit which includes at least one of an electronic parking brake (EPB) driver, a valve driver, and a motor driver and includes a first microcontroller unit (MCU) configured to control the EPB driver, the valve driver, and the motor driver according to a signal received from the sensor unit, and a second control unit which performs the same function as the first control unit and constitutes redundancy of the first control unit.

The second control unit may operate only when the first control unit does not operate normally.

The valve driver may include a valve driver included in a separate chip, a valve driver included in a first application specific integrated circuit (ASIC) chip included in the first control unit, and a valve driver included in a second ASIC chip included in the second control unit.

The valve drivers included in the first and second ASIC chips may drive valves for a function of an electronic stability control (ESC) system or an anti-lock brake system (ABS), and the valve driver included in the separate chip may drive valves for a foot brake function.

The first control unit may include a first motor driver and a first three-phase inverter, the second control unit may include a second motor driver and a second three-phase inverter, and the first MCU or the second MCU may control a dual winding motor which is simultaneously connected to the first three-phase inverter of the first control unit and the second three-phase inverter of the second control unit.

When the first control unit fails, the second control unit may control the dual winding motor only with the second three-phase inverter and the second motor driver.

The first control unit may include a first car area network (CAN) transceiver, the second control unit may include a second CAN transceiver, and the first MCU and the second MCU may communicate with each other through the first CAN transceiver and the second CAN transceiver.

The first MCU and the second MCU may communicate with each other through general purpose input/output (GPIO) or universal asynchronous receiver/transmitter (UART).

The first control unit may receive a signal value of a sensor connected to the second control unit through the first CAN transceiver, or the second control unit may receive a signal value of a sensor connected to the first control unit through the second CAN transceiver.

The pressure sensor may include a first pressure sensor, a second pressure sensor, and a third pressure sensor, the first pressure sensor and the second pressure sensor may be connected only to the first control unit, and the third pressure sensor may be connected only to the second control unit.

When the first control unit fails, the second control unit may control the brake system only with the third pressure sensor in a state in which performance is degraded as compared with a case in which all of the first, second, and third pressure sensors operate.

The pedal sensor may include an output of a first channel and an output of a second channel, the output of the first channel may be connected to the first control unit, and the output of the second channel may be connected to the second control unit.

The output of the first channel and the output of the second channel of the pedal sensor may output different values according to settings, and when the first control unit fails, the output of the second channel may output the same value as the output of the first channel before the first control unit fails.

Advantageous Effects

According to the present invention, by providing redundant control units having the same structure, even when one control unit fails, the redundant control unit performs the same function, and thus, it is possible to cope with an emergency situation, thereby increasing stability.

Meanwhile, even if the effects are not explicitly mentioned here, the effects described in the following specification, which are expected by the technical characteristics of the present invention, and the provisional effects thereof are handled as described in the specification of the present invention.

※ The accompanying drawings are included to provide a further understanding of the technical idea of the present invention, and thus the scope of the present invention is not limited thereto.

MODES OF THE INVENTION

Hereinafter, a configuration of the present invention guided by various exemplary embodiments of the present invention and effects resulting from the configuration will be described with reference to the accompanying drawings. In describing the present invention, the detailed descriptions of the related known-functions that are obvious to a person skilled in the art and would unnecessarily obscure the subject of the present invention are omitted.

Terms such as "first," "second," and the like may be used to describe various components, but the components should not be limited by the above terms. The terms may be used only for the purpose of distinguishing one component from another component. For example, without departing from the scope of the present invention, a "first component" may be called a "second component," and similarly, a "second component" may also be called a "first component." In addition, a singular expression may include a plural expression, unless otherwise specified. The terms used in the exemplary embodiments of the present invention may be interpreted with the commonly known meaning to those of ordinary skill in the relevant technical field unless otherwise specified.

Hereinafter, a configuration of the present invention guided by various exemplary embodiments of the present invention and effects resulting from the configuration will be described with reference to the accompanying drawings.

Figure 1:
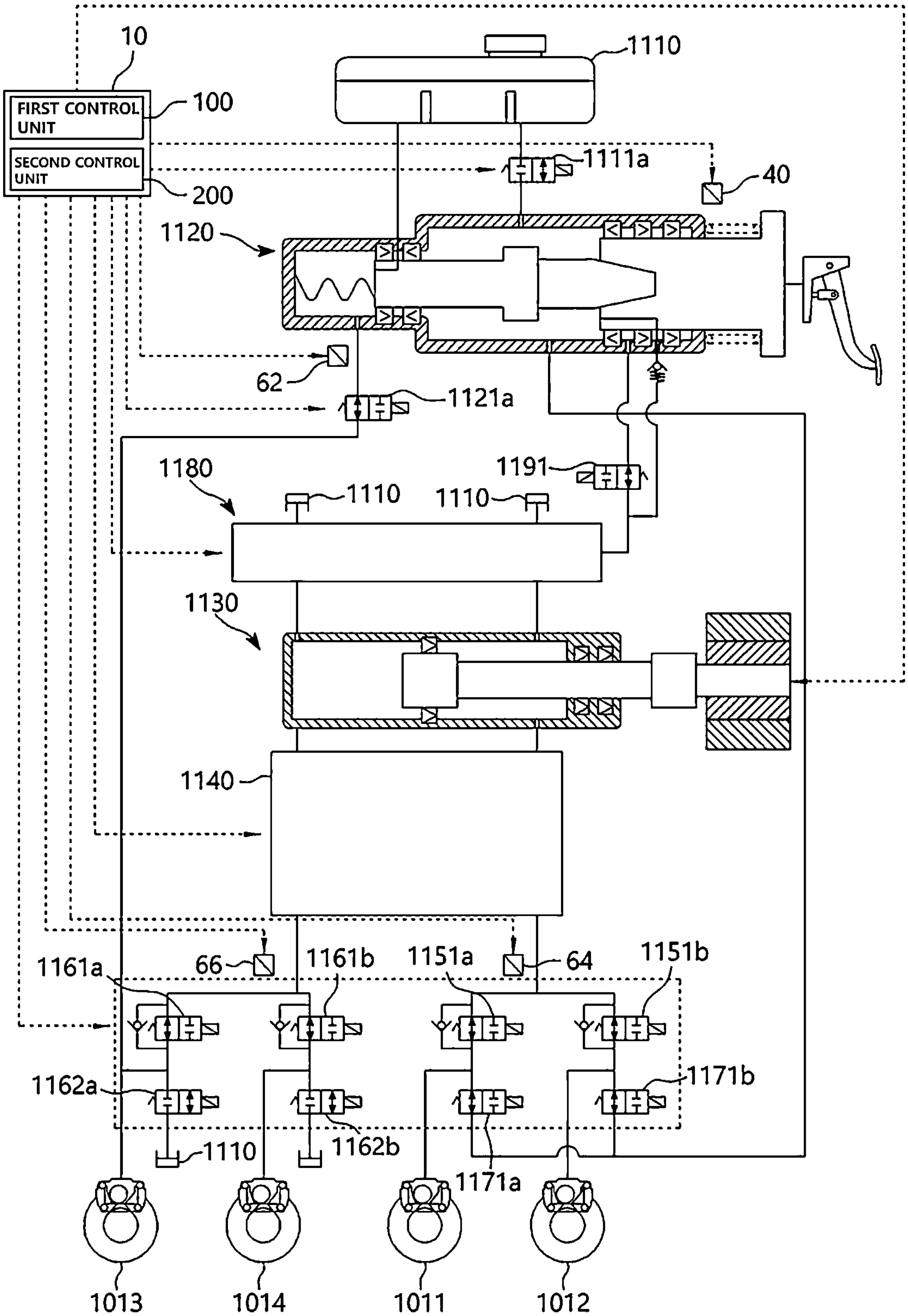
FIG. 1 is a schematic structural diagram of an entirety of a brake system according to an exemplary embodiment of the present invention

FIG. 1 is a schematic structural diagram of the entirety of a brake system according to one exemplary embodiment of the present invention.

The brake system includes a reservoir 1110, a master cylinder 1120, a hydraulic pressure supply device 1130, a hydraulic control unit 1140, a dump control unit 1180, valves and sensors for controlling channels, and an electronic control unit (ECU) for controlling the components.

The reservoir 1110 stores a pressure medium that flows along a flow path to generate pressure. The pressure medium flows to a required place according to an adjustment of a valve. A simulator valve 1111*a* formed in a flow path of the reservoir 1110 controls a flow of a pressure medium between the reservoir 1110 and the master cylinder 1120. During normal operation, the simulator valve 1111*a* is opened so that a user links the reservoir 1110 and the master cylinder 1120. In an abnormal operation mode, the simulator valve 1111*a* is closed so that a pressure medium of the master cylinder 1120 is transferred to valves for controlling wheel cylinders through a backup flow path.

When a driver presses a brake pedal, the master cylinder 1120 pressurizes and discharges a pressure medium such as brake oil accommodated therein. Thus, the master cylinder 1120 provides a reaction force according to a braking depression force to the driver. A cut valve 1121*a* controls a flow in a backup flow path between the master cylinder 1120 and the valves for controlling the wheel cylinders.

The hydraulic pressure supply device 1130 generates hydraulic pressure according to a position of a pedal and transmits the hydraulic pressure to the wheel cylinders of wheels 1011, 1012, 1013, and 1014, whereby a vehicle is braked. The hydraulic pressure supply device 1130 includes a motor to generate hydraulic pressure.

The hydraulic control unit 1140 controls the hydraulic pressure provided from the hydraulic pressure supply device 1130.

The dump control unit 1180 controls a flow of a pressure medium between the reservoir 1110 and the hydraulic pressure supply device 1130.

Each valve opens or closes a flow path formed between the reservoir 1110 and the master cylinder 1120 or the reservoir 1110 and the hydraulic pressure supply device 1130 to control a flow of a pressure medium. The valves are provided as check valves formed to allow only one direction flow without the need for control or solenoid valves of which opening and closing are controlled under control of an ECU 10.

Inlet valves 1161*a*, 1161*b*, 1151*a*, and 1151*b* control a flow of a pressure medium supplied from the hydraulic pressure supply device 1130 to the wheel cylinders.

Outlet valves 1162*a* and 1162*b* control a flow of a pressure medium discharged from the wheel cylinders to the reservoir 1110.

Furthermore, other outlet valves 1171*a* and 1171*b* control a flow of a pressure medium between the wheel cylinders and the master cylinder 1120.

A diagnostic valve 1191 is used when a diagnostic mode of examining a failure of other valves or a leak in a flow path is performed.

The ECU 10 receives signals from sensors 40, 62, 64, and 66 and controls the respective valves or the motor included in the hydraulic pressure supply device 1130 to control the operation of the brake system.

Figure 2:
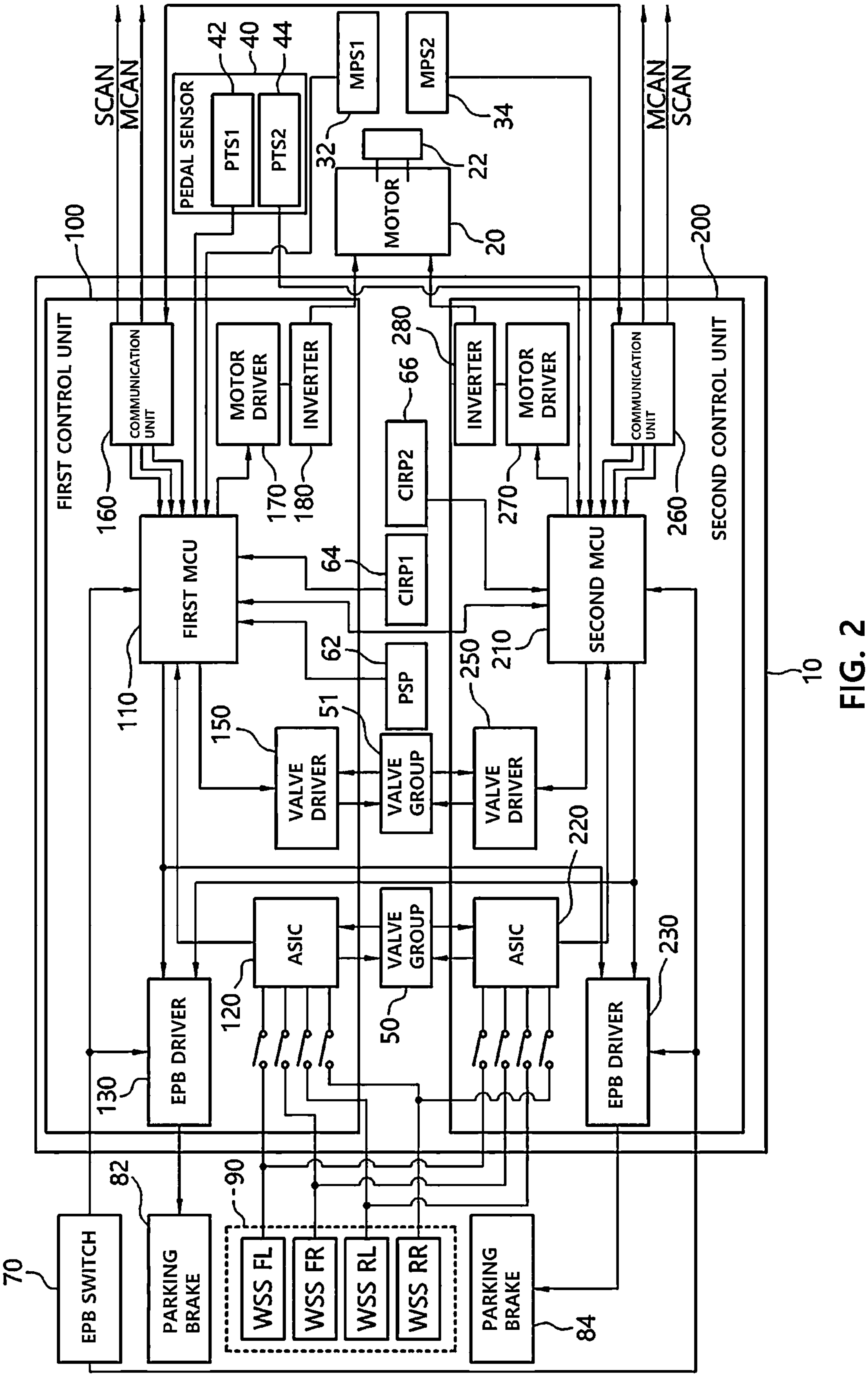
FIG. 2 is a structural diagram of a brake control device according to an exemplary embodiment of the present invention.

FIG. 2 is a more detailed structural diagram of a brake control device according to an exemplary embodiment of the present invention.

As described above, the ECU 10 controls valves, motors, and the like in response to a sensor input.

To this end, the ECU 10 may include a control unit equipped with a microcontroller unit (MCU).

The ECU 10 of the present invention includes a first control unit 100 and a second control unit 200 so as to constitute redundancy.

The first control unit 100 includes a first MCU 110, a first valve driver 150, a first application specific integrated circuit (ASIC) chip 120, a first electronic parking brake (EPB) driver 130, and a first motor driver 170 which are controlled by the first MCU 110.

The first MCU 110 controls the first EPB driver 130 or a second EPB driver 230 according to a signal of an EPB switch 70 to operate a first parking brake 82 or a second parking brake 84. In order to detect a parking state, a speed of wheels 1011, 1012, 1013, and 1014 is input from a wheel speed sensor (WSS) 90. A signal of the WSS 90 is decoded by the first ASIC chip 120 and transmitted to the first MCU 110.

The first MCU 110 controls a motor 20 in response to an input of a pedal sensor 40. Accordingly, the pedal sensor 40 may be included in the ECU 10.

A signal of a first channel 42 of the pedal sensor 40 is transmitted to the first MCU 110 of the first control unit 100, and a signal of a second channel 44 thereof is transmitted to a second MCU 210 of the second control unit 200.

The first MCU 110 detects a position of a pedal using the signal of the first channel 42 of the pedal sensor 40 and thus controls the motor 20 of a hydraulic pressure supply device 1130. In order to drive the motor 20, the first control unit 100 includes a first motor driver 170 and a first inverter 180. The first inverter 180 is a three-phase inverter and is connected to a connector of the motor 20 to drive the motor 20. The first channel 42 and the second channel 44 of the pedal sensor 40 may output the same signal or different signals according to settings. When different signals are output, the first MCU 110 and the second MCU 210 may exchange the different signals through car area network (CAN) communication or the like. In addition, in a situation in which a signal cannot be received from the first MCU 110 due to a situation such as a failure of the first control unit 100, the second pedal sensor 44 may be set to output the same signal as the first pedal sensor 42.

The first MCU 110 and the second MCU 210 may communicate with each other through a first communication unit 160 or a second communication unit 260 or may communicate with a vehicle CAN communication unit. Alternatively, the first MCU 110 and the second MCU 210 may be directly connected to transmit or receive signals through a general purpose input/output (GPIO) or universal asynchronous receiver/transmitter (UART) interface. Accordingly, the first MCU 110 may also receive a signal of a sensor connected only to the second MCU 210 through a communication interface between the MCUs.

A motor position sensor (MPS) is required for more precise driving of the motor 20. To this end, a first MPS 32 and a second MPS 34 may be included in the ECU 10 and connected to the first control unit 100 and the second control unit 200, respectively.

The MPSs 32 and 34 are positioned in the vicinity of a magnet 22 of the motor 20 to measure an accurate rotational position of the motor. The first MCU 110 precisely controls the motor 20 by receiving accurate position information of the motor 20 from the first MPS 32.

In order to control valves 50 and 51 in the first MCU 110, valve drivers are required. To this end, the first control unit 100 and the second control unit 200 may include valve drivers 150 and 250 provided in separate chips, or a first ASIC chip 120 may include valve drivers.

Figure 3:
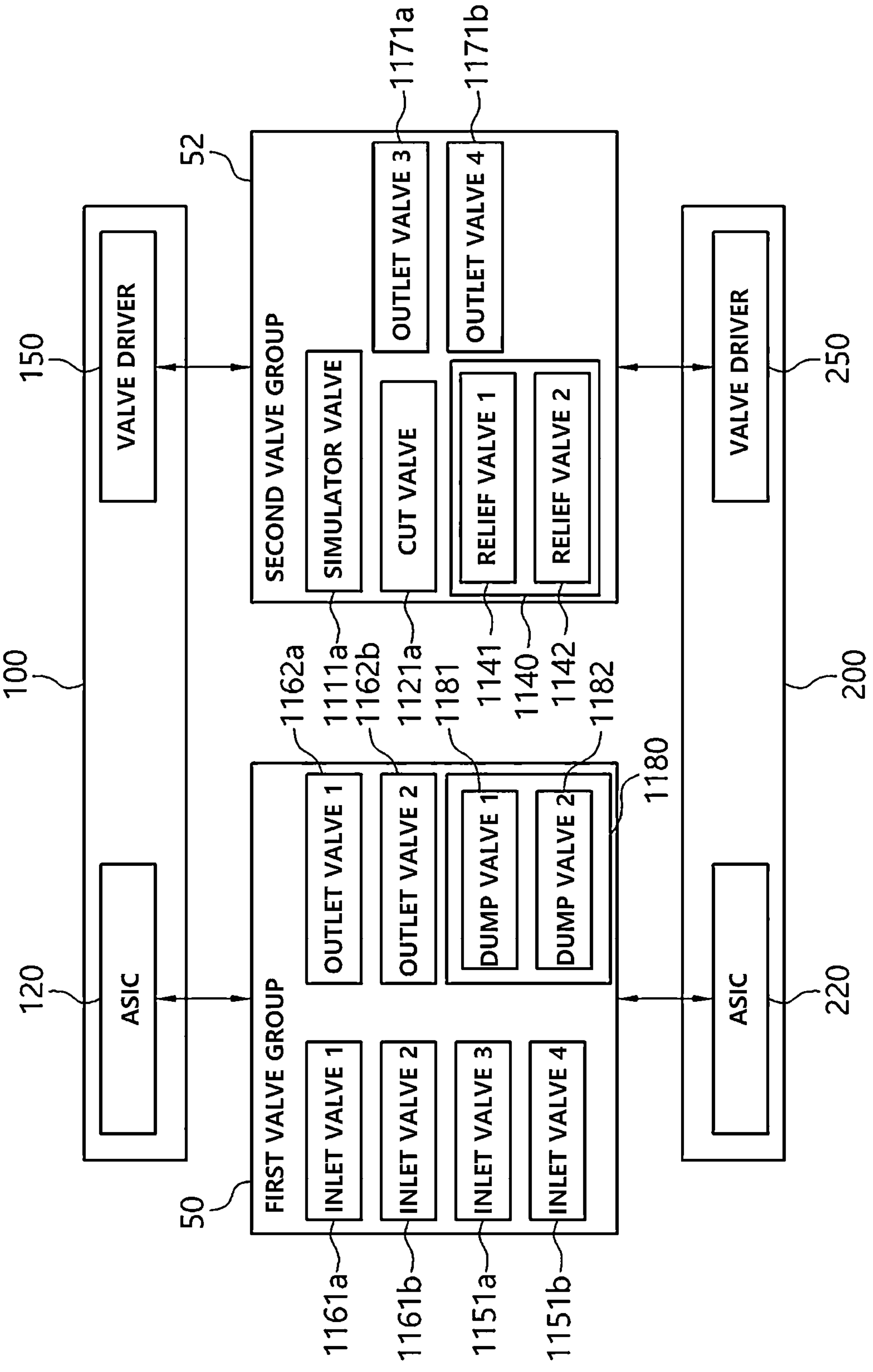
FIG. 3 is a structural diagram of valve drivers according to an exemplary embodiment of the present invention.

FIG. 3 illustrates structures of valve drivers and controlled valves according to an exemplary embodiment of the present invention in more detail.

The valve drivers may include valve drivers included in the first ASIC chip 120 and valve drivers 150 provided in separate chips.

Valves included in a first valve group 50 controlled by the first ASIC chip 120 are inlet valves 1161*a*, 1161*b*, 1151*a*, and 1151*b* for controlling a transfer of a pressure medium of the hydraulic pressure supply device 1130 to wheel cylinders. The inlet valves may be normal open type solenoid valves that are opened in a normal situation and are closed under control of a valve driver.

The valves may also be outlet valves 1162*a* and 1162*b* for controlling a flow of a pressure medium discharged from the wheel cylinders. The outlet valves may be normal close type solenoid valves that are closed in a normal situation and are opened by a valve driver. Alternatively, the valves may be dump valves 1181 and 1182 that control a flow in a flow path between a reservoir 1110 and the hydraulic pressure supply device 1130.

The valves driven by the first ASIC chip 120 may be valves that are operated not only in a situation in which a driver generally presses a brake pedal but also in a situation in which a brake system is operated, for example, by a control device such as an electronic stability control (ESC) system or an anti-lock brake system (ABS).

Valves controlled by the valve drivers 150 provided in the separate chips may include valves that are operated when the driver presses the brake pedal in a normal situation.

Valves included in a second valve group 52 controlled by the valve drivers 150 provided in the separate chips may include relief valves 1141 and 1142 for controlling flow paths between the hydraulic pressure generation device 1130 and the wheel cylinders, outlet valves 1171*a* and 1171*b* for controlling flow paths between a master cylinder 1120 and the wheel cylinders, a simulator valve 1111*a* for forming a pedal feeling, and a cut valve 1121*a* for controlling backup flow paths between the master cylinder 1120 and the wheel cylinders. A valve driver (not shown) for controlling a diagnostic valve 1191 may also be controlled by the valve driver provided in the separate chip.

A second ASIC chip 220 or valve drivers 250 included in a second control unit 200 may also perform the same functions as the first ASIC chip 120 or the valve drivers 150 of the first control unit 100.

Returning to FIG. 2 again, the first MCU 110 may receive signals from a first pressure sensor 62 and a second pressure sensor 64 to control valves.

The first pressure sensor 62 may be a pedal simulator pressure (PSP) sensor for forming a pedal feeling, and the second pressure sensor 64 may be a circuit pressure (CIRP) sensor for measuring pressure between the hydraulic pressure supply device 1130 and wheel cylinders.

For brake control, the first MCU 110 may use signals of a third pressure sensor 66 as well as signals of the first and second pressure sensors 62 and 64. Since the third pressure sensor 66 is connected only to the second MCU 210, a pressure value may be transmitted and used through communication between the MCUs as described above.

The second control unit 200 includes the same components as the first control unit 100 to constitute redundancy of the first control unit 100.

To this end, the second control unit 200 includes the second MCU 210, the second ASIC chip 220, the second EPB driver 230, the valve drivers 250, and a second motor driver 270.

An output of the second channel 44 of the pedal sensor 40 is input to the second control unit 200 and transmitted to the second MCU 210, and if necessary, an output of the first channel 42 may also be used by being received through a second CAN transceiver 260 or the like.

In a situation in which the first MCU 110 or the first EPB driver 230 does not operate, the second MCU 210 may control both an RL parking brake 82 and an RR parking brake 84 through the second EPB driver 230.

The second ASIC chip 220 decodes an input of the WSS 90 to transmit the decoded output to the second MCU 210 and includes some valve drivers. A distinction between valve drivers included in an ASIC chip and valve drivers provided in separate chips is as described above.

The second MCU 210 drives the motor 20 through the second motor driver 270 and more precisely controls the motor 20 through the second MPS 34. To this end, the motor 20 may be a dual winding motor that is controlled by both a first inverter 180 and a second inverter 280 being connected thereto. In a situation in which the first control unit 100 does not operate normally, the motor 20 receives power only from the second inverter 280. Therefore, an operation in a degraded state in which only one winding among dual windings is connected is performed.

In addition, only the third pressure sensor 66 among the pressure sensors is connected to the second MCU 210. In a general situation in which the first control unit 100 operates normally, the first pressure sensor 62 and the second pressure sensor 64 are connected to the first MCU 110, and the third pressure sensor 66 is connected to the second MCU 210 to transmit a signal to the first MCU 110 through a communication channel. Accordingly, the first MCU 110 may control valves using signals of all three pressure sensors.

However, in a state in which the first control unit 100 does not operate normally, the second MCU 210 may not receive signals from the first and second pressure sensors 62 and 64. Accordingly, the second MCU 210 controls the brake system in a degraded state only with a signal from the third pressure sensor 66.

In a brake control system according to the present invention as described above, there may be provided a brake system capable of, by constituting redundancy, even when a part of a system fails, securing a braking force through the remaining system.

The protection scope of the present invention is not limited to the disclosure and expressions of the exemplary embodiment clearly described above. In addition, it is added that the protection scope of the present invention is not limited by modifications and substitutions obvious to the technical field to which the present invention pertains.

The invention claimed is:

1. A control device of a brake system, comprising:

a sensor unit including at least one of a pedal sensor, one or more pressure sensors, and a motor position sensor;

a first control unit including a first electronic parking brake (EPB) driver, a first valve driver, a first motor driver, and a first microcontroller unit (MCU) configured to control the first EPB driver, the first valve driver, and the first motor driver according to a signal received from the sensor unit; and a second control unit including a second EPB driver, a second valve driver, a second motor driver, and a second MCU configured to control the second EPB driver, the second valve driver, and the second motor driver according to the signal received from the sensor unit, the second control unit is configured to perform the same function as the first control unit and constitute redundancy of the first control unit, wherein the first valve driver is connected between the first MCU and valves, the second valve driver is connected between the second MCU and the valves, and the first motor driver and the second motor driver are connected to one motor.

2. The control device of claim 1, wherein the second control unit operates only when the first control unit does not operate normally.

3. The control device of claim 1, further comprising a third valve driver included in a separate chip, wherein the first valve driver is included in a first application specific integrated circuit (ASIC) chip included in the first control unit; and the second valve driver is included in a second ASIC chip included in the second control unit.

4. The control device of claim 3, wherein:

the first and second valve drivers included in the first and second ASIC chips are configured to drive valves for a function of an electronic stability control (ESC) system or an anti-lock brake system (ABS); and the third valve driver included in the separate chip is configured to drive valves for a foot brake function.

5. The control device of claim 1, wherein:

the first control unit includes the first motor driver and a first three-phase inverter;

the second control unit includes the second motor driver and a second three-phase inverter; and the first MCU or the second MCU controls a dual winding motor which is simultaneously connected to the first three-phase inverter of the first control unit and the second three-phase inverter of the second control unit.

6. The control device of claim 5, wherein, when the first control unit fails, the second control unit controls the dual winding motor only with the second three-phase inverter and the second motor driver.

7. The control device of claim 1, wherein:

the first control unit includes a first car area network (CAN) transceiver;

the second control unit includes a second CAN transceiver; and the first MCU and the second MCU communicate with each other through the first CAN transceiver and the second CAN transceiver.

8. The control device of claim 1, wherein the first MCU and the second MCU communicate with each other through general purpose input/output (GPIO) or universal asynchronous receiver/transmitter (UART).

9. The control device of claim 7, wherein:

the first control unit receives a signal value of a sensor connected to the second control unit through the first CAN transceiver; or the second control unit receives a signal value of a sensor connected to the first control unit through the second CAN transceiver.

10. The control device of claim 1, wherein:

the one or more pressure sensors include a first pressure sensor, a second pressure sensor, and a third pressure sensor;

the first pressure sensor and the second pressure sensor are connected only to the first control unit; and the third pressure sensor is connected only to the second control unit.

11. The control device of claim 10, wherein, when the first control unit fails, the second control unit controls a brake system only with the third pressure sensor in a state in which performance is degraded as compared with a case in which all of the first, second, and third pressure sensors operate.

12. The control device of claim 1, wherein:

the pedal sensor has an output of a first channel and an output of a second channel;

the output of the first channel is connected to the first control unit; and the output of the second channel is connected to the second control unit.

13. The control device of claim 12, wherein:

the output of the first channel and the output of the second channel of the pedal sensor output different values according to settings; and when the first control unit fails, the output of the second channel outputs the same value as the output of the first channel before the first control unit fails.

* * * * *